2,838,525

Patented June 10, 1958

2,838,525

BROMINATION OF DIBENZOPYRENEQUINONES

Hans Heer, Westfield, N. J., assignor to General Aniline & Film Corporation, New York, N. Y., a corporation of Delaware No Drawing. Application May 10, 1956
Serial No. 583,918

15 Claims. (Cl. 260—362)

The instant invention relates to the bromination of dibenzopyrenequinones and more particularly to an improved process for the production of brominated dibenzopyrenequinones which avoids the use of elemental bromine.

A variety of methods have been hitherto proposed for the bromination of dibenzopyrenequinones, among which include bromination in various media such as organic solvents, aqueous suspensions, acids, and metal chloride melts. The use of a metal chloride melt as the bromination medium is particularly advantageous since the bromination may then be carried out by directly using the reaction mixture which results when subjecting a suitable aromatic ketone, such as for example a 1,5- or 1,4-diaroylnaphthalene or a Bz-1- or -2-aroylbenzanthrone to ring closure by heating such ketone in a melt of alkali metal chloride-aluminum chloride. All of these processes, however, in addition to being individually disadvantageous for one reason or another, have in common the disadvantage of requiring the use of elemental liquid or gaseous bromine. It is well known that bromine is a very serious industrial hazard, liquid bromine being particularly destructive of any and all human tissues with which it comes in contact. It must be stored and handled in specially constructed containers, which are hermetically sealed, to prevent loss and/or contamination of the surrounding area with harmful and corrosive vapors. Further, when employed in the above processes, the quantity of bromine employed must be considerably in excess of the amount actually introduced into the dibenzopyrenequinone. Still further, extended periods of time are required for addition of the bromine to the reaction mixture containing the dibenzopyrenequinone which is of course technically and economically undesirable. Such extended periods of time may result in thickening of hot melt media due to excessive sublimation of aluminum chloride therefrom.

It is an object of this invention to provide a process for brominating dibenzopyrenequinones while avoiding the use of molecular bromine. Another object of this invention is the provision of an improved process for brominating dibenzopyrenequinones in a melt of alkali-metal chloride-aluminum chloride. Other objects and advantages will appear as the description proceeds.

The above objects are attained by the instant invention which comprises a process for brominating dibenzopyrenequinone by forming a solution of a dibenzopyrenequinone in a melt of aluminum chloride and alkali-metal (sodium or potassium) chloride and then subjecting the melt to the action of a solid salt of hydrobromic acid in the presence of an oxidizing agent. It has been found that the process of this invention not only avoids the use of molecular bromine, but in addition enables the use of a much lower excess of brominating agent and a substantial reduction in the period of time within which the bromination is completed. More specifically, the instant process enables addition into the melt of the amount of brominating agent required for every atom of bromine to be introduced into the dibenzopyrenequinone within a period of time which may be as low as 20 minutes or less. In the instant process it is usually sufficient to add to the melt an excess of from about 5% to 25% of bromine in the form of a bromide salt as defined above, the excess being measured against the bromine which has been actually finally introduced into the dibenzopyrenequinone. The highest excess that has been observed was below 50%, and the lowest one less than 2%. As distinguished therefrom, the brominating process disclosed in FIAT Final Report 1313, page 128, requires 20 hours for the introduction of two atoms of bromine into the dibenzopyrenequinone, and an amount of bromine of 100% in excess of the amount actually introduced into the dyestuff. The excess of bromine required in Examples 1 and 3 of U. S. Patent No. 1,901,307 are respectively about 155% and 215% in excess. Both of these cited references disclose use of elemental bromine as the brominating agent.

The reaction mixtures employed in the instant process are characterized by the absence thereover of the red vapors of bromine found in prior art processes employing molecular bromine as the brominating agent. Thus, the above cited FIAT disclosure states that "care should be taken that as little air as possible is drawn over the melt or else bromine is lost." Only ordinary equipment and precautions are accordingly required in the instant process.

The alkali metal chloride-aluminum chloride melt employed as the reaction medium in the instant process is well known in the prior art, and generally contains sufficient alkali-metal chloride, preferably sodium chloride, to render the medium fluid under the reaction temperatures employed which may range from about 80 to 200° C. Usually, the melt contains about 1 part by weight of sodium chloride for each 4 to 6 parts by weight of aluminum chloride. A sufficient quantity of melt must of course be employed to dissolve the dibenzopyrenequinone being brominated. As stated supra, a melt may be employed containing the relatively crude dibenzopyrenequinone as produced by ring closure of a suitable aromatic ketone in a melt of alkali metal chloride-aluminum chloride.

It will be understood that the term "dibenzopyrenequinones" includes 3,4,8,9-dibenzopyrene-5,10-quinone, 4,5,8,9 - dibenzopyrene - 3,10 - quinone and their halo- (chloro-, bromo-, etc.), hydroxy-, alkoxy-(methoxy-, ethoxy-, etc.), and amino nuclearly substituted derivatives. All such dibenzopyrenequinones may be brominated to any desired degree with for example from 1 to 4 bromine atoms, in accordance with the instant process, provided of course that nuclear positions in the dibenzopyrenequinone are available for bromination.

The solid salt of hydrobromic acid employed as brominating agent in the instant process contains a bromine atom as its anion and a metal or ammonium cation. Although a great variety of metals may be employed as the cation, the alkaline earth metal salts, such as calcium bromide and magnesium bromide, and more particularly the alkali metal salts such as sodium bromide and potassium bromide are preferred, particularly those which are free of water of crystallization. As ammonium cation, there may be employed unsubstituted ammonium ion, or organically substituted ammonium radicals particularly lower alkyl substituted ammonium radicals which may be derived from lower alkyl primary, secondary or tertiary amines such as the mono-, di-, and trimethyl- or ethylammonium bromides. Inorganic salts are preferred.

As the oxidizing agent employed in the process of the instant invention, oxygen may be employed in pure form or in the form of air, with attendant advantages with respect to economy and prevention of introduction of additional substances into the reaction media which must be later removed. However, a great variety of other known oxidizing agents, inorganic or organic, and solid, liquid or gaseous in nature are also operative. As representative of such oxidizing agents there may be mentioned metal, particularly alkali metal, and ammonium salts such as the permanganates, chlorates, bromates, nitrates, chromates, persulfates, perborates, arsenates, and the like, oxides such as lead peroxide, manganese dioxide, vanadium pentoxide, arsenic pentoxide, barium peroxide, ferric oxide, cupric oxide, mercuric oxide, and the like, and organic oxidizing agents which are negatively substituted aromatic nitro compounds such as m-dinitrobenzene and homologues thereof, dinitronaphthalenes, dinitroanthracenes, m-nitrobenzene sulfonic acid, nitronaphthalene sulfonic acids, nitroanthracene sulfonic acids, picric acid, nitrochlorobenzenes and homologues thereof and the like. The amount of oxidizing agent to be employed in any particular instance will depend upon the amount of bromide salt being used, and the particular oxidizing agent and its oxidizing potential in the reaction medium. Such amount of oxidizing agent should be at least sufficient to liberate all the bromine present in the bromide salt, and an excess thereof of from about 5 to 25% is preferred. This amount may in any particular instance be readily determined by a worker skilled in the art. It should be pointed out that the use of an oxidizing agent in the instant process is essential since no bromination of the dibenzopyrenequinone takes place in its absence.

The process of the instant invention is carried out by adding the solid hydrobromic acid salt to the melt containing the dibenzopyrenequinone in small portions in the presence of the oxidizing agent. The oxidizing agent may be added to the melt before or after addition of the bromide salt, but it is preferably added gradually over the same period during which the bromide salt is added. When the oxidizing agent is oxygen or air, it may be introduced into the melt as a continuous or intermittent current while stirring during the period of time in which the solid bromide is being added. When a solid or liquid oxidizing agent is used, it may be introduced into the melt in small portions, alternating them with small portions of bromide salt. Alternatively, a mixture of the oxidizing agent and bromide salt may be first prepared and small portions of this mixture added to the melt while stirring. Following addition of the predetermined amount of bromide salt to the melt, the melt is preferably stirred for an additional period of time such as from ½ to 2 hours, while maintaining the same temperatures, to insure completion of the reaction. Oxygen may be passed into the reaction mixture during this additional stirring time. The reaction mixture is then treated in known manner to recover the brominated dyestuff, for example by decomposition by water, preferably by pouring the melt into water, followed by filtration of the precipitated brominated dyestuff and washing the recovered precipitate under acid conditions.

The resulting dyestuff may, if desired, be purified by the usual methods, as for example by crystallization from sulfuric acid or from organic solvents, or by boiling up with these, by treatment with oxidizing agents such as alkali metal hypochlorites, or the like to obtain the dyestuff as a bright yellow to orange colored product. The brominated products of the instant invention may be employed in known manner as vat or pigment dyestuffs, or as intermediates for the production of new dyestuffs by reason of their excellent reactivity.

The following examples, in which parts are by weight unless otherwise indicated are illustrative of the instant invention and are not to be regarded as limitative:

*Example 1*

To a melt of 530 parts of AlCl₃ and 94 parts of NaCl are added 62.5 parts of 1,5-dibenzoylnaphthalene and while stirring at 150–160° C. a current of oxygen is introduced. After the transformation into dibenzopyrenequinone is complete, 23.2 parts of potassium bromide are added in small portions in about 45 minutes time at 140 to 145° C. while maintaining the current of oxygen. The melt is stirred 30 minutes longer while maintaining the temperature and current of oxygen and is then poured into water. The brominated dibenzopyrenequinone is a brownish yellow precipitate which is filtered and washed free of salts with hot diluted hydrochloric acid.

All but 6% of the quantity of bromine which was added to the melt in the form of bromide is found in the dyestuff by analytical methods. The brominated dyestuff contains approximately one atom of bromine per molecule.

If more potassium bromide is used, there can be introduced more than one atom of bromine per dyestuff molecule without difficulty.

*Example 2*

84 parts of 1,5-dibenzoylnaphthalene are dissolved in a melt of 900 parts of aluminum chloride and 160 parts of sodium chloride and ring closed according to known methods in the presence of oxygen which is introduced into the melt at 150–160° C. while stirring, or at the same temperature in the presence of aromatic nitro compounds which contain in addition to the nitro group at least one negative substituent, as described in U. S. Patent No. 2,238,180. When the formation of dibenzopyrenequinone is complete, or nearly so, the temperature of the melt is adjusted to 140° C. and 54.1 g. sodium bromide are added in small portions in 1½ hours at 140–150° C. in the presence of oxygen. The melt is stirred ½ hour longer while maintaining the temperature and current of oxygen and then poured into water. The brominated dyestuff is a brownish orange flocculent precipitate which is filtered off and washed free of salts under acid conditions.

All but 12% of the bromine which was added in the form of sodium bromide is found in the dyestuff by analytical methods. The brominated dibenzopyrenequinone contains approximately two atoms of bromine per molecule. It can be treated by known methods with alkali metal hypochlorites or it can be filtered as a vat and obtained in the form of a brilliantly orange colored precipitate.

*Example 3*

33.2 parts of dibenzopyrenequinone are dissolved in a melt of 264 parts of AlCl₃ and 66 parts of NaCl and while stirring at 150–160° C. a mixture of 10.8 parts of sodium bromide and 10.8 parts of m-nitrobenzene sulfonic acid sodium salt is added in small portions in 20 minutes. The melt is stirred for 1½ hours longer at the same temperature and then poured into water. The brominated dyestuff is freed from salts by known methods.

All but 9% of the bromine which was added in the form of sodium bromide is contained in the dibenzopyrenequinone as determined analytically. The brominated dyestuff contains approximately one atom of bromine per molecule.

*Example 4*

33.2 parts of dibenzopyrenequinone are dissolved in a melt of 272 parts of AlCl₃ and 48 parts of NaCl and, while stirring at 145–155° C., there is added in small portions a mixture of 10.6 parts of sodium bromide and 9.2 parts of sodium nitrate during 45 minutes. After 1 hour's time of stirring at the same temperature the melt is poured into water and the brominated dyestuff freed from salts by known methods.

All but 16% of the bromine which was added as bromide is found in the dyestuff. The brominated dyestuff contains approximately one atom of bromine per molecule.

More bromine can be introduced without difficulty if more of the sodium bromide-sodium nitrate mixture is employed.

Example 5

Into a melt of 918 parts of $AlCl_3$ and 162 parts of NaCl there are added 50 parts dibenzopyrenequinone and while stirring at 125–135° C. there is added in small portions a mixture of 58 parts sodium bromide and 48 parts potassium bromate in three hours. The reaction mass is stirred at this temperature for 30 minutes longer while introducing oxygen. The melt is then poured into water and the brominated dyestuff is freed of salts by known methods.

All but 27% of the bromine which was added in the form of sodium bromide and potassium bromate is contained in the dibenzopyrenequinone. The brominated dyestuff contains approximately 4 atoms of bromine per molecule.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. A process for brominating dibenzopyrenequinones comprising forming a solution of dibenzopyrenequinone in a melt of aluminum chloride and alkali-metal chloride and then subjecting the melt to the action of a solid salt of hydrobromic acid in the presence of an oxidizing agent.

2. A process as defined in claim 1 wherein said salt is selected from the group consisting of ammonium and metal bromides.

3. A process as defined in claim 1 wherein said salt is an alkali metal bromide.

4. A process as defined in claim 1 wherein said oxidizing agent is oxygen.

5. A process as defined in claim 1 wherein said oxidizing agent is m-nitrobenzene sulfonic acid, sodium salt.

6. A process as defined in claim 1 wherein said oxidizing agent is sodium nitrate.

7. A process as defined in claim 1 wherein said oxidizing agent is potassium bromate.

8. A process as defined in claim 1 wherein said salt is sodium bromide.

9. A process as defined in claim 1 wherein said salt is potassium bromide.

10. A process as defined in claim 1 wherein said alkali metal chloride is sodium chloride.

11. A process for brominating dibenzopyrenequinones comprising forming a solution of dibenzopyrenequinone in a melt of aluminum chloride and sodium chloride and then subjecting the melt to the action of potassium bromide in the presence of oxygen.

12. A process for brominating dibenzopyrenequinones comprising forming a solution of dibenzopyrenequinone in a melt of aluminum chloride and sodium chloride and then subjecting the melt to the action of sodium bromide in the presence of oxygen.

13. A process for brominating dibenzopyrenequinones comprising forming a solution of dibenzopyrenequinone in a melt of aluminum chloride and sodium chloride and then subjecting the melt to the action of sodium bromide in the presence of m-nitrobenzene sulfonic acid, sodium salt.

14. A process for brominating dibenzopyrenequinones comprising forming a solution of dibenzopyrenequinone in a melt of aluminum chloride and sodium chloride and then subjecting the melt to the action of sodium bromide in the presence of sodium nitrate.

15. A process for brominating dibenzopyrenequinones comprising forming a solution of dibenzopyrenequinone in a melt of aluminum chloride and sodium chloride and then subjecting the melt to the action of sodium bromide in the presence of potassium bromate.

References Cited in the file of this patent

UNITED STATES PATENTS

| Number | Name | Date |
|---|---|---|
| 1,901,307 | Kraenzlein et al. | Mar. 14, 1933 |
| 2,396,989 | Deinet et al. | Mar. 19, 1946 |
| 2,535,131 | Gubelmann | Dec. 26, 1950 |